Sept. 29, 1964 J. RUBELI 3,150,740
INSTALLATION FOR AN EXTENSIBLE SUPPORTING POLE
Filed March 22, 1962 10 Sheets-Sheet 1
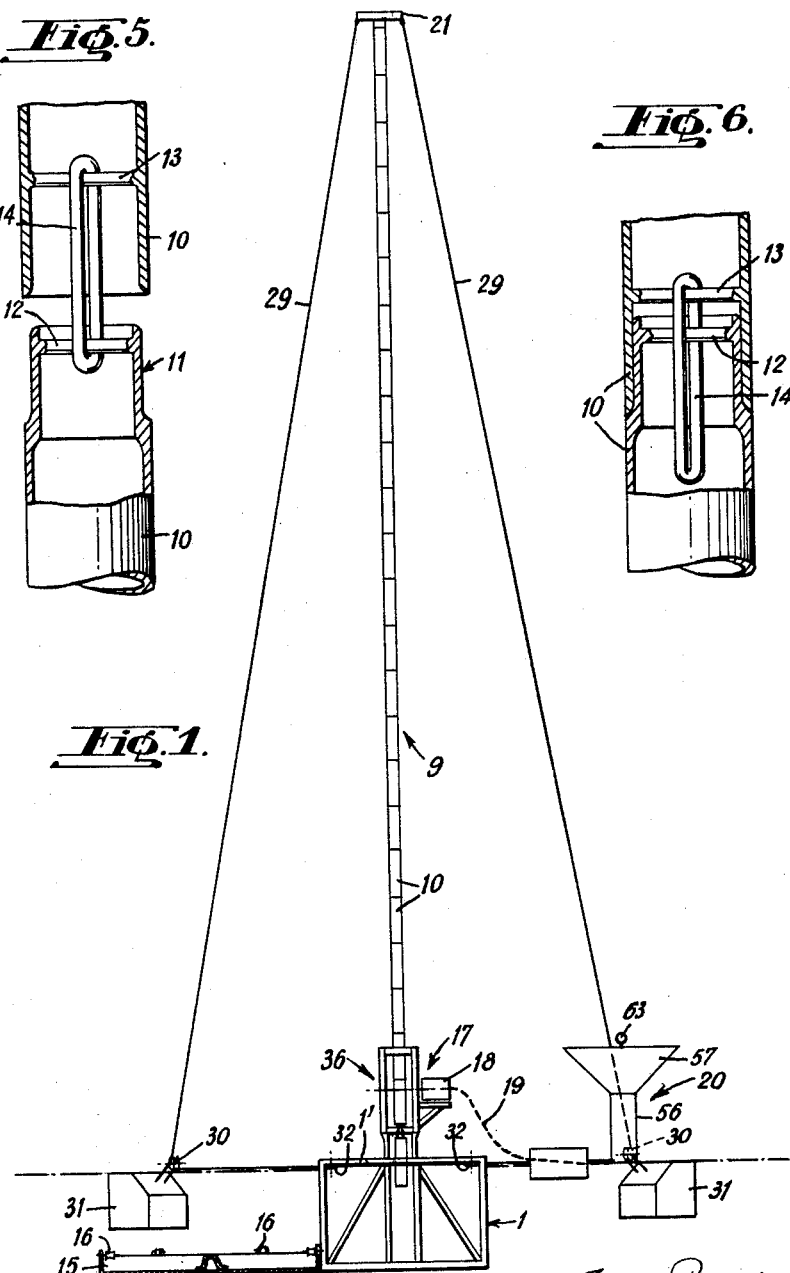
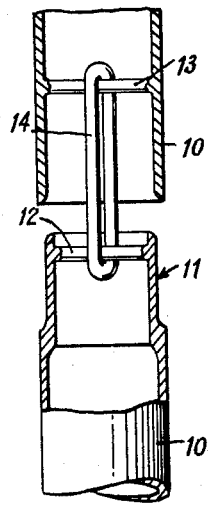
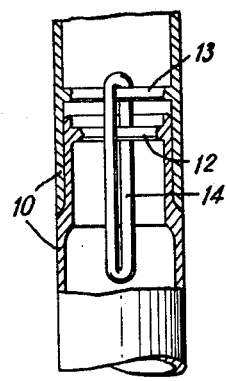
Jean Rubeli
INVENTOR
By Wenderoth, Lind & Ponack,
ATTORNEYS

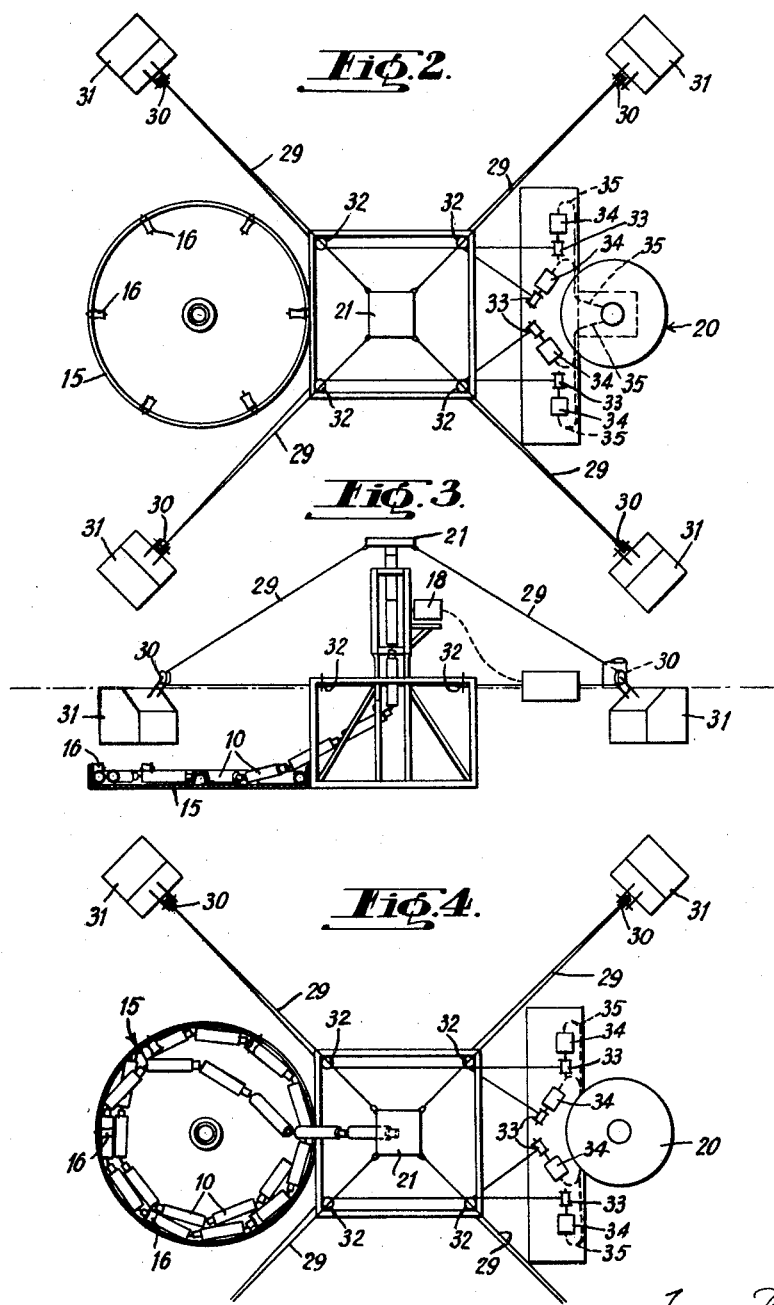

Sept. 29, 1964  J. RUBELI  3,150,740
INSTALLATION FOR AN EXTENSIBLE SUPPORTING POLE
Filed March 22, 1962  10 Sheets-Sheet 3

Jean Rubeli
INVENTOR
By Wenderoth, Lind & Ponack
ATTORNEYS

Sept. 29, 1964 J. RUBELI 3,150,740
INSTALLATION FOR AN EXTENSIBLE SUPPORTING POLE
Filed March 22, 1962 10 Sheets-Sheet 4
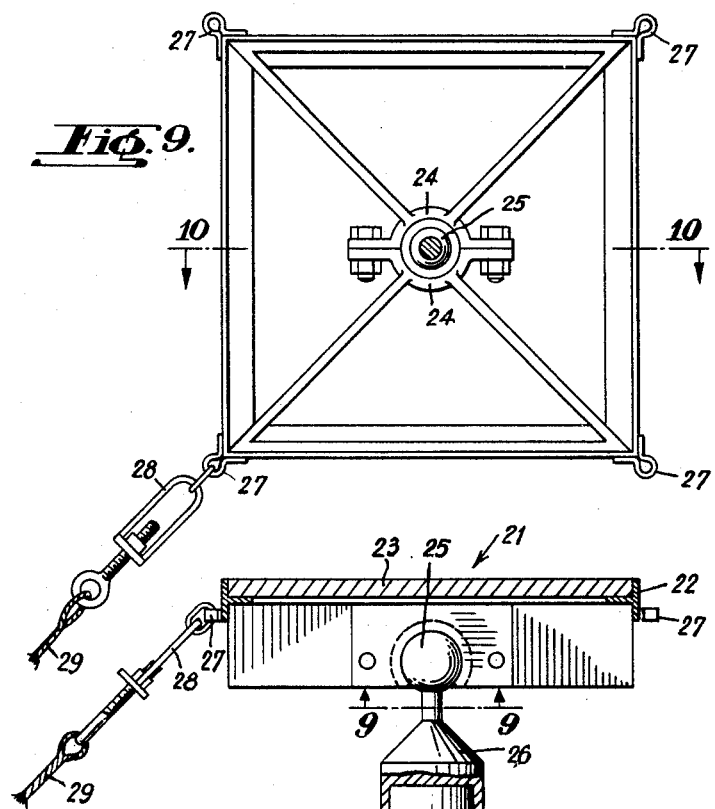
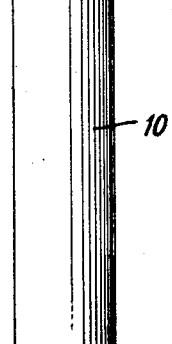
Jean Rubeli
INVENTOR
By Wenderoth, Lind & Ponack,
ATTORNEYS

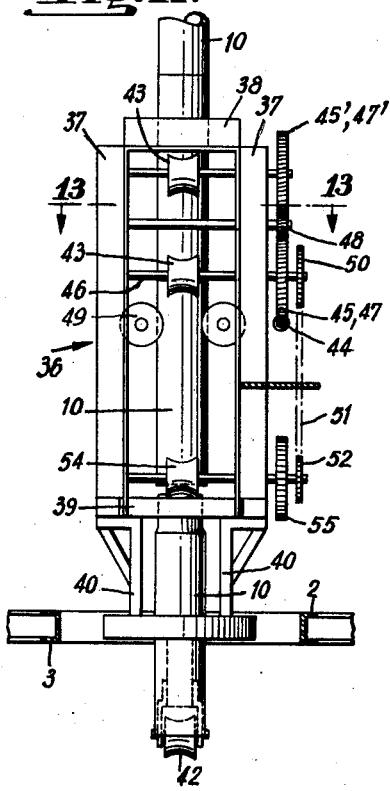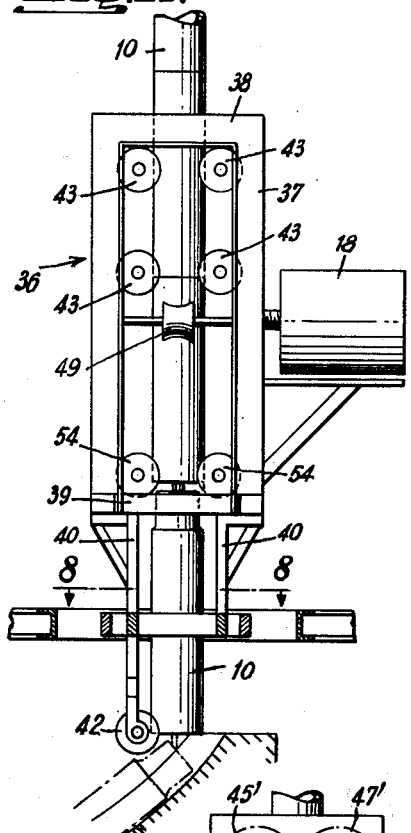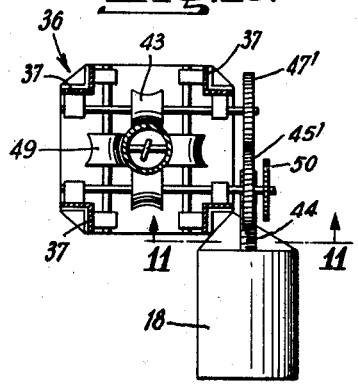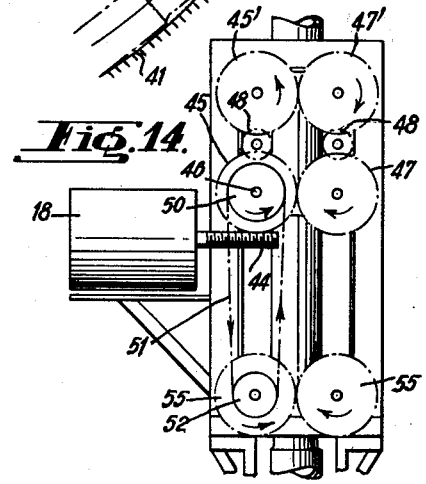

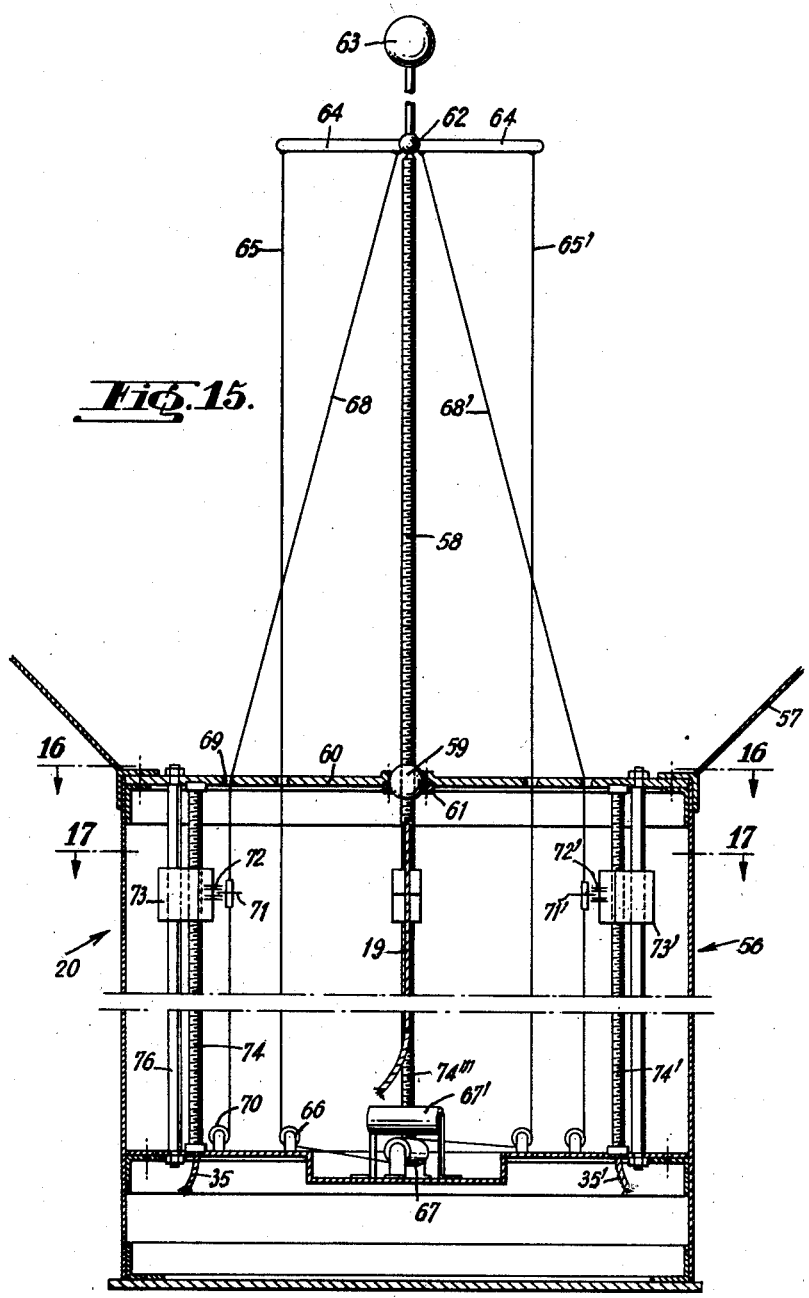

Sept. 29, 1964   J. RUBELI   3,150,740
INSTALLATION FOR AN EXTENSIBLE SUPPORTING POLE
Filed March 22, 1962   10 Sheets-Sheet 7
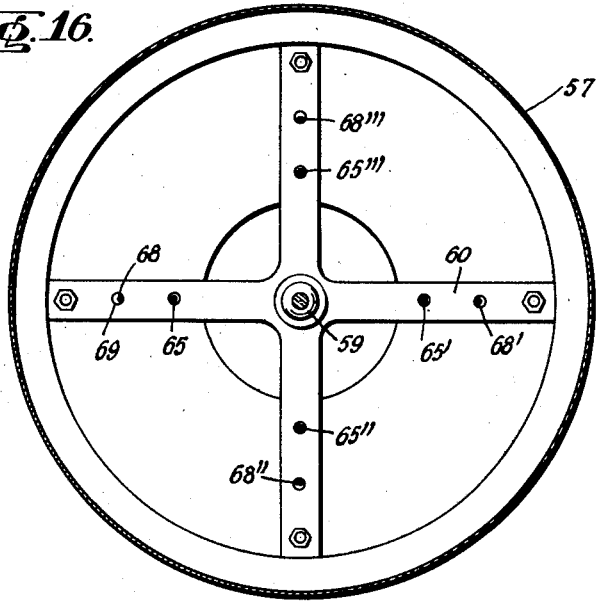
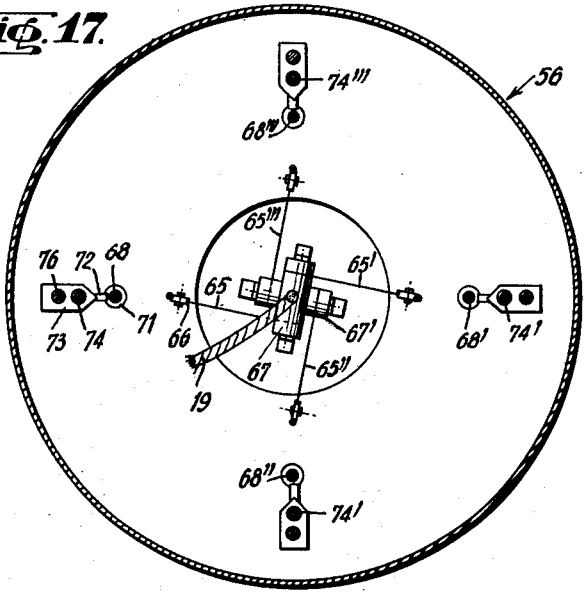

Sept. 29, 1964  J. RUBELI  3,150,740
INSTALLATION FOR AN EXTENSIBLE SUPPORTING POLE
Filed March 22, 1962  10 Sheets-Sheet 8
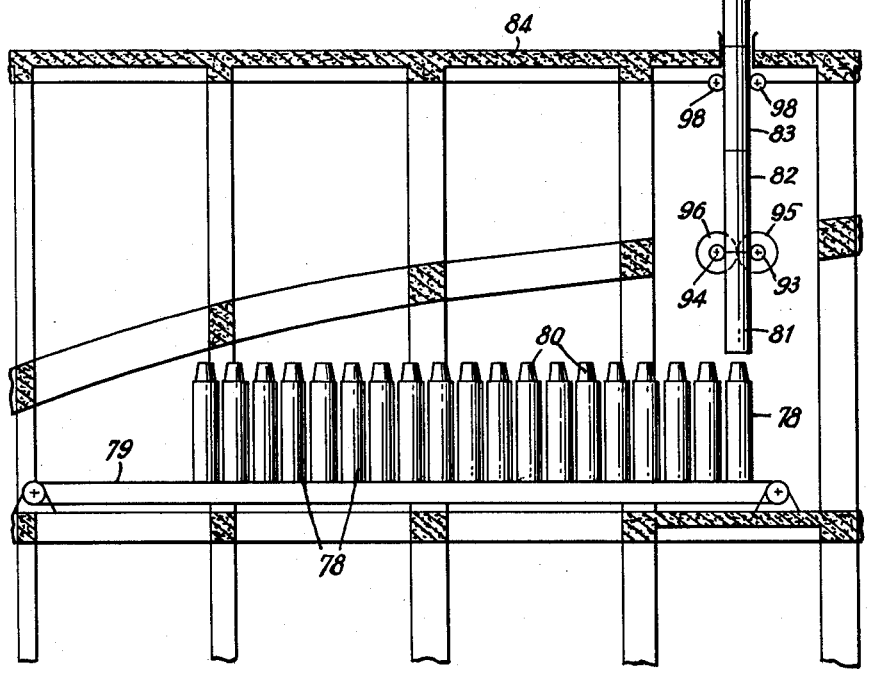

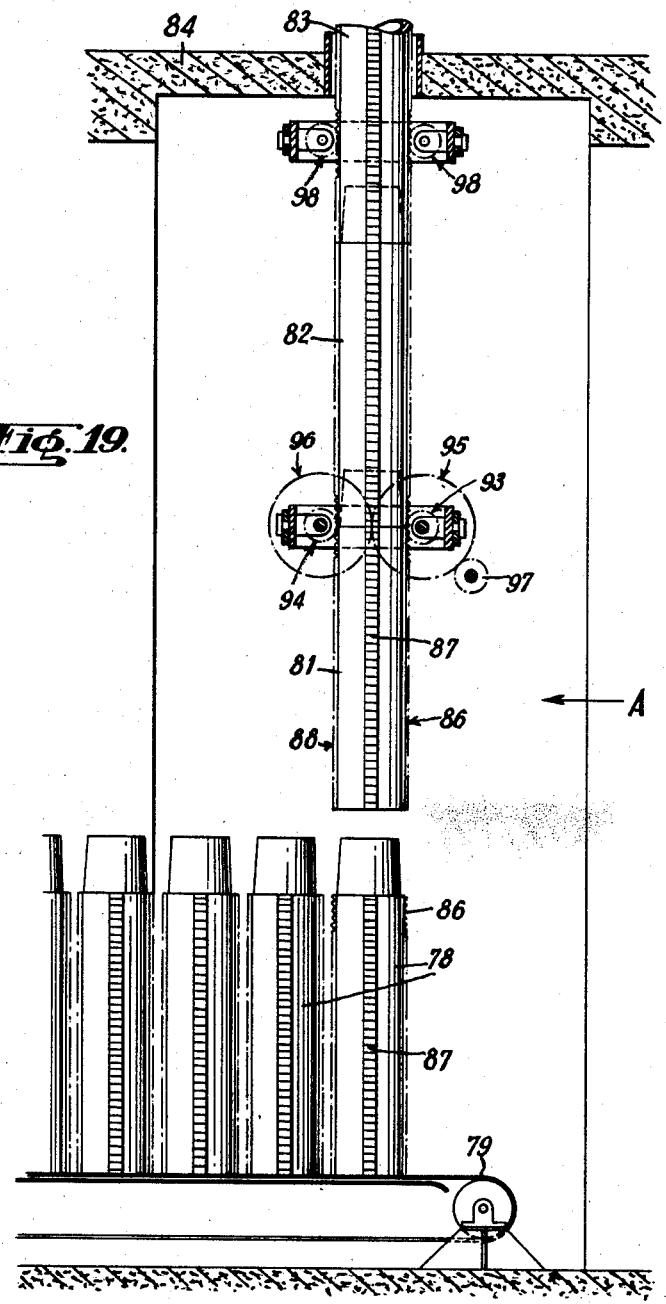

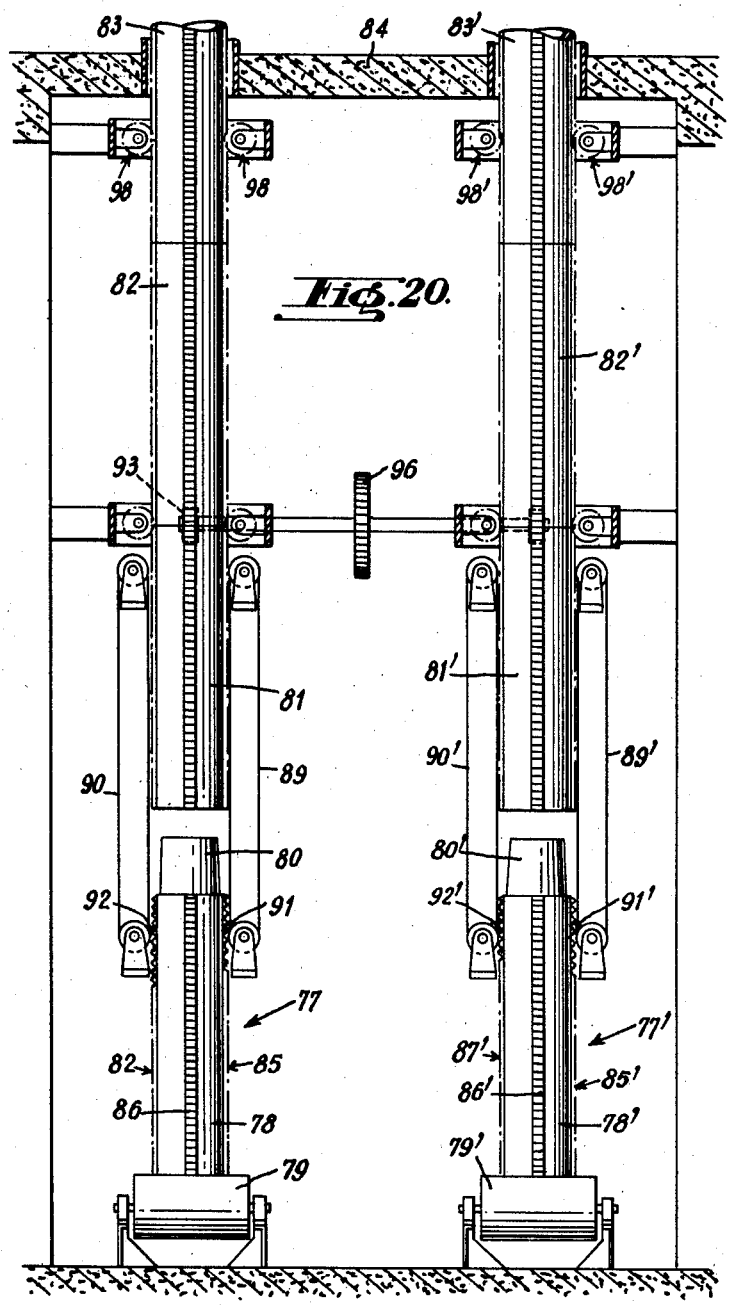

United States Patent Office

3,150,740
Patented Sept. 29, 1964

3,150,740
INSTALLATION FOR AN EXTENSIBLE
SUPPORTING POLE
Jean Rubeli, 27a Chemin Boissier, Cologny-
Geneva, Switzerland
Filed Mar. 22, 1962, Ser. No. 181,733
Claims priority, application Switzerland Mar. 25, 1961
5 Claims. (Cl. 182—41)

The present invention has for object an installation for an extensible supporting pole, designed to be employed in particular to support one or several projectors in an open air lighting installation.

The installation according to the invention is characterized in that it comprises a pole composed of a series of elements, interconnected and capable of being joined together as one piece one relative to the other, guying cables connected at least to the upper end of the pole, and means for simultaneously controlling the extension of the pole and of the ropes in such a way that these remain taut.

The accompanying drawing shows, by way of example, two embodiments of the pole of the present invention.

FIGURE 1 is a view as a whole in elevation of the first embodiment, the pole being in extended vertical position.

FIGURE 2 is a plan view of the pole.

FIGURE 3 is a view in elevation of the pole in another position.

FIGURE 4 is a plan view of the pole shown in FIG. 3.

FIGURES 5 and 6 are sectional views to a larger scale of details of the pole in two different positions.

FIGURE 9 is a plan view also to a larger scale of another detail of FIG. 1.

FIGURE 10 is a section along line 10—10 of FIG. 9.

FIGURE 11 is a view in elevation to a larger scale of of a part of FIG. 1 and in section along line 11—11 of FIG. 13.

FIGURE 12 is a view similar to FIG. 11 but turned through 90°.

FIGURE 13 is a section along line 13—13 of FIG. 11.

FIGURE 14 is a view similar to FIG. 12 but turned through 180°.

FIGURE 15 is a side elevational view, partly in section, of the control means of the first embodiment, for extending the pole and the ropes.

FIGURES 16 and 17 are sections along lines 16—16 and 17—17 respectively of FIG. 15.

FIGURE 18 is a diagrammatic view, in elevation of a part of the installation according to a second embodiment.

FIGURE 19 is a view, in elevation, to a larger scale, of details of the second embodiment.

FIGURE 20 is a view in elevation in the direction of the arrow A of FIG. 19.

Figure 7:
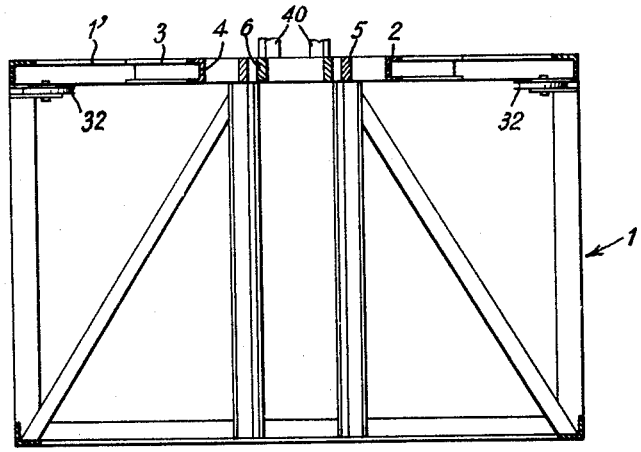
FIGURE 7 is a view to a larger scale of a detail of FIG. 1 in section along line 7—7 of FIG. 8.
Figure 8:
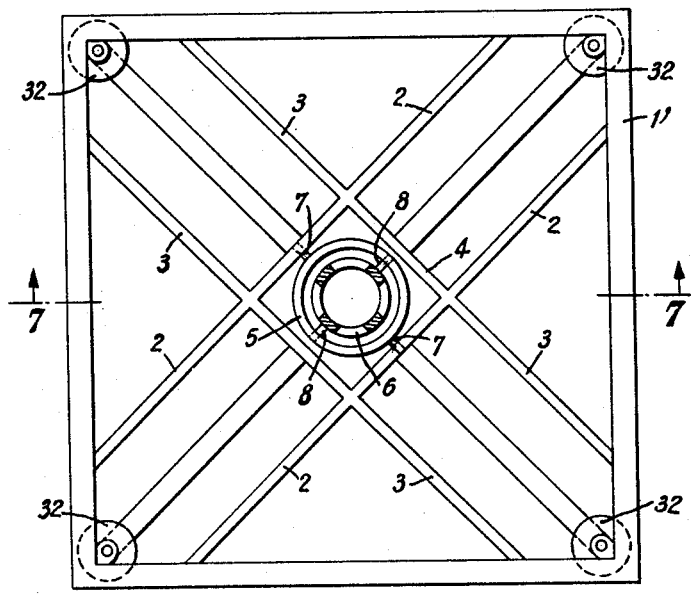
FIGURE 8 is a plan view partly in section along line 8—8 of FIG. 12 of this same detail.

The extensible supporting pole shown as a whole in FIG. 1, is employed to support, for example, one or several projectors in an open air lighting installation. This pole comprises a foundation socket 1 shown to a larger scale in FIGS. 7 and 8 and formed by a cage of square cross section made of iron sections soldered together. The upper square frame 1′ of the socket 1 is constituted by corner irons and has divided cross-braces 2 and 3 providing in the centre a square 4 designed to support concentric universal joint rings 5 and 6. The outer ring 5 is journalled at 7 on two opposite sides of the square 4 diagonally of the upper frame 1′ and the inner ring 6 is journalled at 8 on the outer ring 5, the pivot-pins 8 being aligned along the other diagonal of the upper frame 1′.

The pole generally shown by 9 is constituted by nesting elements 10 two of which are shown to a larger scale in FIGS. 5 and 6. Each element 10 is constituted by a tubular cylindrical body one end 11 of which is of reduced diameter so as to fit into a neighbouring element as shown in FIG. 6. Pins 12 and 13 pass through the two ends of each element with which they may be manufactured as one piece as shown. A free ring 14 serving to hold the successive elements 10 passes around the pin 12 of a lower element and around the pin 13 of the adjacent upper element.

A drum 15 serves for the reception of the nesting elements 10 as shown in FIGS. 3 and 4, this drum comprising supporting rollers 16 on its periphery.

The pole raising mechanism is generally designated at 17 and includes a motor 18 of which a power gear drives a flexible cable 19 connected to a control station 20 which will be described in more detail hereafter.

The pole 9 carries at its upper part a platform 21 designed to receive a load, such, for example, as one or several lighting projectors. This platform 21 shown to a larger scale in FIGS. 9 and 10, is constituted by a square frame of soldered T-irons 22 and in which is mounted a plate 23. The diagonals of the frames 22 carry semispherical half-shells 24 designed to be secured with bolts after having been assembled on a ball-joint 25 integral with a member 26 fitted on the first element 10 or pole top element. The frame 22 has at each angle a shackle 27 to which is connected a stretcher 28 for a guying cable 29. Each cable 29 passes over a pulley 30 secured to an anchoring block 31 and then over a pulley 32 secured in one of the angles of the frame 1′ and from there to a winding drum 33 of a corresponding motor 34. A power drive opposite to the winding drum 33 drives a flexible cable 35 connected to the control 20 for the purpose which will be described hereafter.

One will now describe in detail the mechanism for assembling the elements 10 and raising the pole 9 with reference to FIGS. 11 to 14. This mechanism includes a chassis designated generally by 36, formed by four vertical corner irons 37 soldered to an upper frame 38 also formed by angle irons and to a lower frame 39 formed by flat irons. The chassis 36 is fixed on four pedestals 40 soldered to the inner ring 6. This mounting permits of directing the chassis 36 along any slope as will be described hereafter. The elements 10 arriving from the drum 15 are guided in a trough shown diagrammatically by 41 in FIG. 12 and are swung into the vertical position by an idle pulley 42 fixed to an extension of one of the pedestals when these elements are pulled by those which precede them.

The drive of the upper elements 10 is effected through the agency of driving pulleys 43 driven by the motor 18 from an endless screw 44 integral with the power shaft driving a toothed wheel 45 wedged on the shaft 46 of the lower pulley 43 visible in FIG. 11. The toothed wheel 45 meshes with a similar toothed wheel 47 wedged on the shaft of the lower pulley 43 diametrally opposite to the one mentioned above as shown in FIG. 12. The diametrally opposed upper pulleys 43 are driven to rotate in the same direction as the lower pulleys through the agency of reversing pinions 48 gearing with the lower toothed wheels 45 and 47 and identical upper toothed wheels 45′ and 47′ (see FIG. 14).

Two diametrically opposed idle pulleys 49 serve as guides for the nested elements 10.

The shaft 46 carries a chain wheel 50 over which passes a chain 51 designed to drive a chain wheel 52 of smaller diameter than the wheel 51. This wheel 52 is wedged on a shaft 53 carrying a pulley 54 in engagement with the elements 10 to be nested. A toothed wheel 55 also wedged on the shaft 53 serves to drive a second pulley 54 diametrally opposite to the pulley 54. The pulleys 54 serve for the nesting of the elements 10 arriving from the drum 15 because they drive them more rapidly than those displaced by the pulleys 43. These latter serve for the raising, lowering and for the support of the pole. The control station 20 is constituted by a reduction of the pole, for example to a twentieth. It comprises a cylindrical frame 56 topped by a removable protective metal sheet 57 in the shape of a truncated cone. A copper threaded rod 58 is screwed in a swivel-joint 59 mounted between two half-shells of which one, the upper one, forms part of a cross-bar 60 mounted on the upper part of the frame 56 and the other one, the lower one 61, is screwed on the cross-bar 60. The lower end of the rod 58 is connected to the cable 19 of the elastic transmission from the motor 18. The top of the rod carries a swivel-joint 62 welded thereto. An upper handle 63 is fixed on an extension of the rod 58. Two half-shells surround the swivel-joint 62 and carry four crossed horizontal arms 64 the diametrally opposed ends of which are connected by cables 65, 65', 65'' and 65''' of constant length forming an undeformable parallelogram designed to maintain the horizontal position of the arms 64 and consequently of the upper platform 21. To this end, the cables 65, 65' pass through the four arms of the crossbar 60, each of them passing over a return pulley 66, and then wind on drums 67, 67' provided with an inner return spring in order to maintain a symmetrical unwinding or winding of the cables 65, 65', 65'', 65''' and maintain the arms 64 horizontal.

Under each of the arms 64 is fixed a control cable 68 passing through each of the arms of the cross-bar 60 by holes 69 lined with an insulating substance and then winding on a drum 70 also provided with an inner return spring (not shown) urging this drum in such a way as to maintain the cable 68 stretched. A contact disk 71 is fixed on each cable 68 and serves for the control of four contact segments 72 fixed on cursors 73 of insulating material, for example bakelite, mounted on rotating threaded rods 74, 74', 74'', 74'''. Two of the segments serve as a safety circuit-breaker and the other two are connected by insulated flexible wires to the corresponding motor 34. The flexible transmission cable 35 connecting this motor 34 to the threaded rod 74 rotates the latter and causes the cursor 73, sliding on a guiding rod 76, to rise or fall.

The electric contact may be established by contact between the segments 72 under the pressure of the disk 71 or by contact between a segment 72 and the disk 71. In this case it is necessary to provide for the insulation of the cable 68 at its various points of contact with the frame, that is to say at the upper attachment on the arm 64, at the passage of the cross-bar 60, and on the drum 70.

In order to extend the supporting pole described one proceeds in the following manner:

Supposing that the nesting elements 10 are in the drum 15 as shown in FIGS. 3 and 4 and that it is desired to raise the pole 9, one starts up the motor 18 so as to drive the elements 10 upwardly through the agency of the pulleys 43. The element 10 not yet fitted (FIG. 12) is pulled by the preceding ones up to the pulleys 54 which, rotating more rapidly than the pulleys 43, drive this element into the preceding one.

The motor 18 simultaneously drives the transmission cable 19 thus screwing the threaded rod 58 in the swivel-joint 59. When the pole 9 is completely extended as shown in FIG. 1, the rod 58 is in the position shown in FIG. 15.

During the extension of the pole 9, the guying cables 29 must be constantly taut thus necessitating a special adjustment of each respective motor 34. To this end, the cables 68 which themselves are constantly taut in following the rising movement of the rod 58, permit each of them to adjust the corresponding motor 34 through the agency of the disk 71 and of the contacts 72. Each threaded rod 74 for the control of the cursor 73 being driven directly by the corresponding motor 34 through the transmission 35, there will therefore exist synchronism between the raising of each cable 68 and that of the corresponding cable 29.

If it is desired for example to tilt the pole towards the right (FIG. 1) at a certain angle, one tilts the rod 58 through this angle towards the right in FIG. 15 by acting on the handle 63. This has for result to reduce the length of the cable 68' and to extend that of the opposite cable 68. The disk 71' will actuate the segments 72' in such a way that the running of the corresponding motor 34 will be reversed and the cable 29 wound up until it catches up the length corresponding to that of the cable 68'. On the other hand, the disk 71 of the cable 68 will act on the segments 72 so as to drive the motor 34 with a view to unwinding the cable 29 until it catches up the length of the corresponding cable 68, that is to say until the cursor 73 has been moved to an extent such that the circuit of the motor is again open.

In a modification of the means for controlling the winding and the unwinding of the guying cables, use might be made of a feeling device moving with the nesting elements by bearing against a cam surface the shape of which is a function of the lengthening of the cables relative to the vertical movement of the elements. This feeling device would act on the circuit of each corresponding cable winding and unwinding motor so as to vary its speed in accordance with the said function.

Although the pole described has been provided to support lighting projectors it could be used for other purposes, particularly to support a working platform. In this case, instead of being mounted on the ground, the pole could for example be mounted on a vehicle and the pole could be a multiple one, that is to say include several columns of nesting elements supporting the said platform.

In order to permit the extension of poles of considerable height, one could provide intermediate cables controlled in the same manner as the cables 29 described.

Instead of employing nesting elements as described, one could provide U-shaped iron elements hinged one to the other and having members of similar cross section in order to eliminate the hinge between two successive elements when the pole is extended.

In a modification, the nesting elements could be provided with outer teeth designed to mesh with driving toothed wheels, the toothed wheel driving one of the said elements rotating at a speed different to that of the wheel driving the following element so as to effect a relative movement of the two elements and consequently their nesting.

A second embodiment of the installation according to the present invention is characterized in that it comprises at least one series of separate tubular elements, placed side by side, means for moving these elements for bringing them successively to a definite spot, means for gripping the element arrived at this spot and fit it into a preceding element, and raising means for moving the nested elements forming a rigid pole.

In the second embodiment, shown in FIGS. 18 to 20, comprising two identical extensible poles, one will only describe one of the poles, the same members of the other pole being designated by the same reference numbers provided with the prime sign. Each pole comprises a series 77 of tubular elements 78, disposed vertically on a horizontal endless band conveyor 79, the two conveyors 79, 79' being parallel. Each element 78 is constituted by a tubular cylindrical body of which the upper end 80 of smaller diameter is slightly conical, so as to be able to fit into the element 81 located directly above as shown in FIGS. 18 and 20. The nested elements 81, 82, 83, etc. form a rigid pole rising above the roof 84 of a building or of a structure such as the stands of a stadium for example. The pole could also issue from ground level, the series of elements 77 would then be disposed inside an underground structure.

Each tubular element 78 carries four racks 85, 86, 87 and 88 extending along four symmetrical generating lines, designed to be engaged two by two, on the one hand by means to fit successively one into the other the tubular elements and, on the other hand by raising means to make them rise and form the rigid pole. The means for fitting the elements one into the other comprise two vertical endless band or chain conveyors 89, 90 each carrying a projection or tooth 91, 92 engaging in the diametrally opposed racks 85, 87 of the element 78.

Two elevating pinions 93 and 94 mesh respectively with the other two racks 86 and 88 of the nested elements 81, 82, these pinions being fixed on parallel shafts carrying moreover toothed wheels 95, 96 rotated by a driving pinion 97 driving the wheel 95.

Finally, in the upper part of the housing enclosing the various members of the installation described up to the present, are disposed guiding pinions 98 directly below openings for the poles to pass through, these pinions gearing with the racks 85, 87 of the corresponding tubular elements.

The elements of the upper end of the two poles are fixed to a projector support (not shown) bearing against the roof of the building when the poles are in the retracted position.

The operation of the installation described is the following:

The horizontal conveyor feeds the series of vertical elements 78 until the right-hand element reaches the fixed position shown in FIGS. 18 to 20. The vertical conveyors 89, 90 then grip the element 78 through the agency of the teeth 91 and 92 which engage the racks 85 and 87 respectively and raise this element until its end 80 is engaged in the preceding element 81 moving more slowly than the element 78 and the pinions 93, 94 gear with the racks 86 and 88 respectively. The teeth 91 and 92 of the vertical conveyors 89 and 90 then free themselves from the respective racks 85 and 87 and during their return movement to the position of FIG. 20, a succeeding element 78 is brought by the conveyor 79 to the position of FIG. 20 and the cycle starts again until all the elements 78 have fitted one into the other. In order that the nesting may take place, it is to be understood that the linear speed of the teeth 91 and 92 must be higher than the elevating speed of the preceding elements and which is given by the pinions 93, 94.

I point out, by way of example, that each element may have a length of about 1 metre and that it is possible to raise poles to a height of 20 to 25 metres. For reasons of simplification of the drawing, one has not shown the guying cables connected at least to the upper end of the poles nor the means provided to control simultaneously the extension of the poles and the cables so that these remain taut, these means being identical to those described and shown in the first embodiment.

Instead of having two series of tubular elements to be fitted one into the other, obviously one only could be provided for a single pole. Moreover, instead of being aligned on a horizontal straight conveyor, the tubular elements could be disposed on the periphery of a circular disk for example.

What I claim is:

1. An extensible pole device, especially for supporting open air projectors, comprising a series of elements capable of being nested one within another to form a pole, a magazine for said elements, means for drawing said elements from said magazine, means for nesting the successive elements one within the other to erect said pole from bottom to top, guys secured to the upper element of said pole capable of winding and unwinding in conjunction with the extension of said pole, a coupling device at the bottom of said pole allowing said pole and said nesting means to lean in any direction, a drum to which each guy is connected, an electric motor for driving each drum to wind and unwind said guys, an electromechanical control dependent on the displaced elements as well as on the inclination with respect to vertical position for individually and positively operating said motor whereby said guys are always taut and all of said elements being identical and each having a narrow part at the upper end and a corresponding recess for nesting at the lower end.

2. A device according to claim 1, wherein said electromechanical control comprises a driven flexible transmission cable, a reduced model of said pole rotatable about its axis by said flexible transmission cable, said model comprising a movable nut, a threaded rod screwing into said nut, control cables controlling said electric motors corresponding to the movements of said rod.

3. A device according to claim 1 wherein said nesting means comprise upper and lower friction rollers, and means for rotating said upper friction rollers more slowly than said lower friction rollers whereby two successive elements coming from said magazine are fitted one within the other toward the top.

4. A device according to claim 3, wherein the upper element of said pole is provided with a platform hinged thereon, means for allowing said platform to lean in any direction and to which said guys are secured, and wherein, at the upper end of said rod said electromechanical control has levers modeled after said platform, which levers can be caused to lean to all sides and are connected to said rod, said levers determining the inclination of the platform with respect to the pole by means of control cables cooperating with drums.

5. A device according to claim 1, wherein said magazine for said elements comprises an endless horizontal conveyor belt whereon said elements are arranged spaced upright in single file, said belt feeding said elements successively underneath a driving means where they are taken by said means and pushed upwards or downwards respectively and put back on said belt.

References Cited in the file of this patent

UNITED STATES PATENTS

| | | |
|---|---|---|
| 354,333 | McDonough et al. | Dec. 14, 1886 |
| 522,252 | Garrison | July 3, 1894 |
| 1,465,182 | Sago | Aug. 14, 1923 |

FOREIGN PATENTS

| | | |
|---|---|---|
| 1,109,391 | France | Sept. 21, 1955 |